United States Patent
Sun et al.

(10) Patent No.: US 7,638,112 B2
(45) Date of Patent: Dec. 29, 2009

(54) METHOD OF MANUFACTURING ZINC ALUMINATE NANO-MATERIAL

(75) Inventors: Hai-Lin Sun, Beijing (CN); Kai-Li Jiang, Beijing (CN); Qun-Qing Li, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/291,302

(22) Filed: Nov. 6, 2008

(65) Prior Publication Data

US 2009/0257947 A1  Oct. 15, 2009

(51) Int. Cl.
*C01F 7/00* (2006.01)
*C23C 14/00* (2006.01)

(52) U.S. Cl. .................. 423/600; 423/622; 423/624; 423/625; 423/594.14; 427/252; 204/192.1

(58) Field of Classification Search ............. 427/225, 427/252, 569; 423/600, 622–624, 594.14; 204/192.1
See application file for complete search history.

(56) References Cited

U.S. PATENT DOCUMENTS

| 2,269,508 | A | * | 1/1942 | Barton | 423/600 |
| 3,668,151 | A | * | 6/1972 | Walker | 502/329 |
| 4,282,117 | A | * | 8/1981 | Muramoto et al. | 252/508 |
| 4,370,310 | A | * | 1/1983 | Walker | 423/600 |
| 5,756,207 | A | * | 5/1998 | Clough et al. | 428/375 |

OTHER PUBLICATIONS

Wang, R. et al. "Single-crystalline AlZnO nanowires/nanotbues Synthesized at Low Temperature". Applied Phys. Letters. 88 (2006).*
Klein, K. L. et al. "Surface Characterization and Functionalization of Carbon Nanofibers". J. App. Phys. 103 (2008).*

* cited by examiner

*Primary Examiner*—Stuart Hendrickson
*Assistant Examiner*—Richard M Rump
(74) *Attorney, Agent, or Firm*—D. Austin Bonderer

(57) ABSTRACT

A method for making zinc aluminate nano-material, the method comprises the following steps. Firstly, providing a growing substrate and a growing device, and the growing device comprising a heating apparatus and a reacting room. Secondly, placing the growing substrate and a quantity of reacting materials into the reaction room, and the reacting materials comprising zinc and aluminum. Thirdly, introducing an oxygen-containing gas into the reaction room. Lastly, heating the reaction room to a temperature of 660~1100° C.

20 Claims, 3 Drawing Sheets

METHOD OF MANUFACTURING ZINC ALUMINATE NANO-MATERIAL

BACKGROUND

1. Field of the Invention

The present invention relates to methods for making nano materials and, particularly, to a method for making a zinc aluminate nano-material.

2. Discussion of Related Art

It is known that zinc aluminates are excellent for use catalyst and ceramic materials. Therefore, achieving various zinc aluminate nano-materials is desirable. Zinc aluminate nano-material is usually fabricated by the method of solid-solid reaction or sol-gel.

The method of using solid-solid reaction for making zinc aluminate nano-material includes the following steps. Firstly, providing a quantity of zinc oxide (ZnO) powder and alumina ($Al_2O_3$) powder. Secondly, mixing the zinc oxide powder and alumina powder, and putting the mixture into a furnace. Thirdly, heating the mixture to a temperature above 1100° C. to obtain a zinc aluminate nano-material. However, the method of solid-solid reaction needs a high temperature above 1100° C. and a time longer than 10 hours usually. The zinc aluminate nano-material fabricated by the method of solid-solid reaction is in powder form with particulates having large average diameter and small specific surface area.

The sol-gel method for making zinc aluminate nano-material includes the following steps. Firstly, providing a sodium hydroxide (NaOH) solution and adding xylene therein to form a mixture. Secondly, heating the mixture to a temperature of 60° C. and adding a quantity of zinc nitrate ($Zn(NO_3)_2$) and aluminum nitrate ($Al(NO_3)_3$) solutions. Thirdly, resting the mixture for 12 hours to get a gel. Lastly, drying the gel using a microwave oven and then let set for 1 hour at a temperature of 250° C. to obtain a zinc aluminate nano-material. However, there are some drawbacks to using this method. Firstly, the sodium hydroxide and nitrate are harmful to the environment. Secondly, it is a time-consuming method. Thirdly, zinc aluminate nano-material made this way is in powder form with particles having small specific surface area.

What is needed, therefore, is an environmental friendly method of making zinc aluminate nano-material.

BRIEF DESCRIPTION OF THE DRAWINGS

Many aspects of the present method for making the zinc aluminate nano-material can be better understood with references to the following drawings. The components in the drawings are not necessarily drawn to scale, the emphasis instead being placed upon clearly illustrating the principles of the present method for making the zinc aluminate nano-material.

Figure 1:
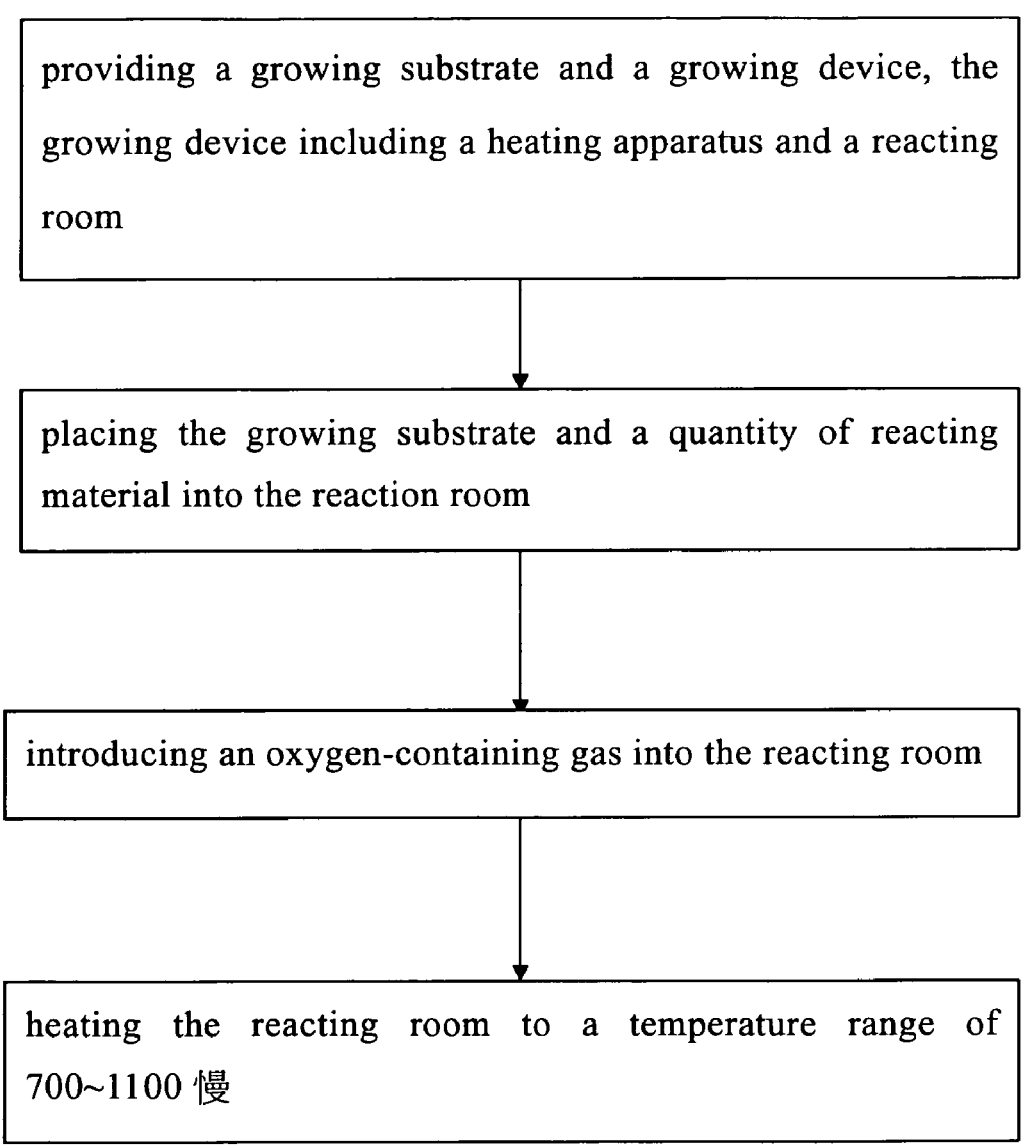
FIG. 1 is a flow chart of a method for making a zinc aluminate nano-material, in accordance with a present embodiment.

Corresponding reference characters indicate corresponding parts throughout the several views. The exemplifications set out herein illustrate at least one embodiment of the present method for making the zinc aluminate nano-material, in at least one form, and such exemplifications are not to be construed as limiting the scope of the invention in any manner.

DETAILED DESCRIPTION

References will now be made to the drawings to describe, in detail, various embodiments of the present method for making a zinc aluminate nano-material.

Figure 2:
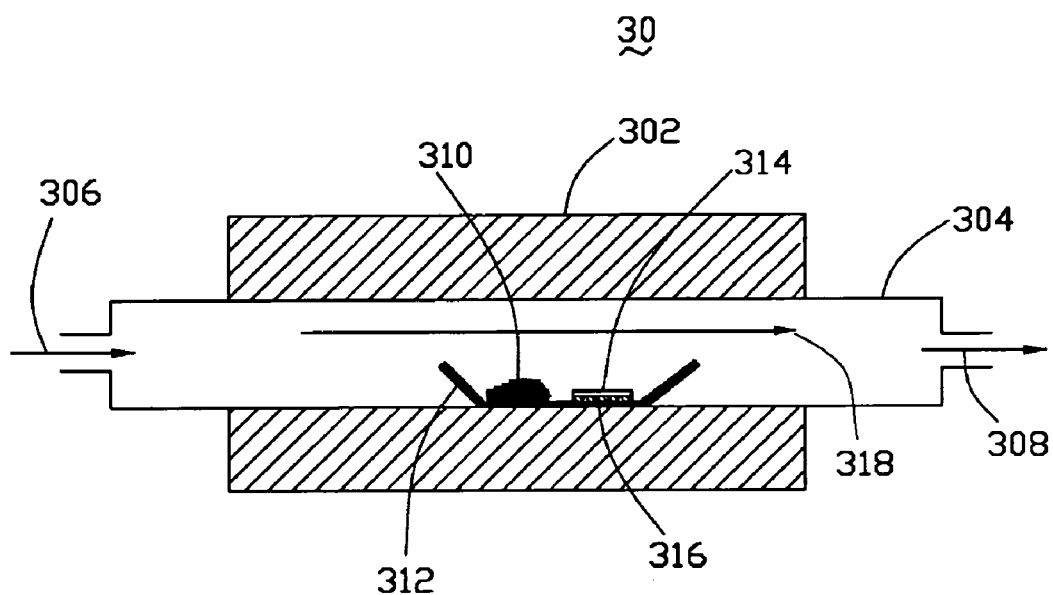
FIG. 2 is a schematic view of a growing device used for making the zinc aluminate nano-material of FIG. 1.

Referring to FIGS. 1 and 2, a method for making the zinc aluminate nano-material includes the following steps: (a) providing a growing substrate 316 and a growing device 30, and the growing device 30 including a heating apparatus 302 and a reacting room 304; (b) placing the growing substrate 316 and a quantity of reacting materials 310 into the reacting room 304; (c) introducing an oxygen-containing gas into the reacting room 304; and (d) heating the reacting room to a temperature of 660~1100° C.

In step (a), the reacting room 304 can be a quartz tube with a gas inlet 306 at one end and a gas outlet 308 at an opposite end. The quartz tube is movably located in the heating apparatus 302. The length of the quartz tube is more than the length of the heating apparatus 302 so that part of the tube can be used as a handle when moving it while still keeping a substantial part of it heated in the heating apparatus 302.

Moreover, a carrier 312 with a high melting point can be disposed in the reacting room 304. In the present embodiment, the carrier 312 is a ceramic boat. The shape of ceramic boat is arbitrary and the volume of thereof can be selected according to need.

In step (a), the growing substrate 316 is made from a non-metallic material with a high melting point (e.g. silicon, silicon dioxide, quartz, glass, sapphire, etc). In the present embodiment, the growing substrate 316 is a silicon wafer. The size of the silicon wafer is arbitrary and can be selected according to need. The growing substrate 316 is cleaned before being placed into the reacting room 304 In the present embodiment, an ultrasonic vibration method for a time that ranges from approximately 10 to 30 minutes.

Before step (b), an optional step (e) of forming a catalyst layer 314 on the growing substrate 316 can be carried out. The method for forming the catalyst layer 314 can be selected from chemical vapor deposition (CVD), sputtering, and plasma-assisted chemical vapor deposition among other methods. The material of the catalyst layer 314 can be selected from gold, iron, copper, cobalt and nickel. The thickness of the catalyst layer 314 ranges from approximately 1 to 500 nanometers. In the present embodiment, the catalyst layer 314 is gold film and about 5 nanometers thick. The purity of the gold is more than 99.9%.

In step (b), various forms of zinc and aluminum can be used as the reacting materials 310 such as blocks or powder. The reacting materials 310 can be a mixture of zinc powder and aluminum powder, a zinc block packaged with aluminum powder, an aluminum block packaged with zinc powder, or a zinc block and an aluminum block being separately disposed. The mass ratio of the zinc and aluminum ranges from 2:1 to 1:2. In the present embodiment, a quantity of zinc powder and aluminum powder are used as the reacting materials 310. The purity of the zinc powder and aluminum powder is more than 99.9%. The mass ratio of the zinc powder and aluminum powder is 65:54. Before placing the reacting materials 310 into the reacting room 304, the reacting materials 310 are each placed in a diluted acid solution for a period of time (e.g. about 2 to 10 minutes) to remove the oxide layer and other impurities on the surface of the reacting materials 310. In the present embodiment, the diluted acid solution is diluted hydrochloric acid solution.

In step (b), the reacting materials 310 can be placed in the carrier 312. The growing substrate 316 can be placed anywhere in the reacting room 304. One surface of growing substrate 316 is exposed to the oxygen-containing gas introduced in following step (c). The vaporized reacting materials 310 are all deposited on the same surface of the growing substrate 316. The growing substrate 316 can be placed above the carrier 312 or between the carrier 312 and the gas outlet 308. In the present embodiment, the carrier 312 is large enough so that the growing substrate 316 can be placed in the carrier 312 together with the reacting materials 310, and the growing substrate 316 is near the gas outlet 308.

Before step (c), an optional step (f) of introducing a protective gas into the reacting room 304 can be carried out. The protective gas is used to evacuate the air in the reacting room 304. In the step (f), the protective gas form a gas flow direction 318 from the gas inlet 306 to the gas outlet 308. The flow rate of the protective gas ranges approximately from 100 to 2000 milliliter per minute. The protective gas is selected from a group comprising nitrogen ($N_2$) gas and noble gases. In the present embodiment, the protective gas is argon (Ar) gas.

In step (c), the oxygen-containing gas is introduced into the reacting room 304 after the air in the reacting room 304 is entirely evacuated. The oxygen-containing gas is introduced in a manner so that it flows from the reacting materials 310 to the growing substrate 316. The protective gas is still added during the introduction of the oxygen-containing gas. The air pressure in the reacting room 304 ranges approximately from 1 to 50 torrs. In the present embodiment, the oxygen-containing gas is oxygen gas. The purity of the oxygen gas is more than 99.99%. The flow rate of the oxygen gas ranges approximately from 10 to 1000 milliliters per minute.

In step (d), the reacting temperature ranges approximately from 660 to 1100° C. The rate the temperature increases in the reacting room 304 is 20° C. per minute. The period of time for growing the zinc aluminate nano-material ranges approximately from 10 to 120 minutes. It is to be understood that the process of introducing the oxygen-containing gas into the reacting room 304 could be carried out after heating the reacting room 304 to the reacting temperature or at the same time as heating the reacting room 304.

In the present embodiment, the reacting temperature is 800° C. The melting point of the aluminum powder is 660° C. and the melting point of the zinc powder is 419.5° C. Once the reacting room 304 is heated to a temperature above 660° C., the aluminum powder and zinc powder melt and begin to vaporize. In a gaseous state, the zinc reacts with the oxygen gas to fabricate zinc oxide (ZnO), and ZnO is deposited on the growing substrate 316 and the aluminum reacts with the oxygen gas to fabricate alumina ($Al_2O_3$), and $Al_2O_3$ is deposited on the growing substrate 316. The zinc oxide and the alumina diffuse in to each other due to the Kirkendall Effect to form a zinc aluminate nano-material, and grow zinc aluminate nanowires on the substrate.

Figure 3:
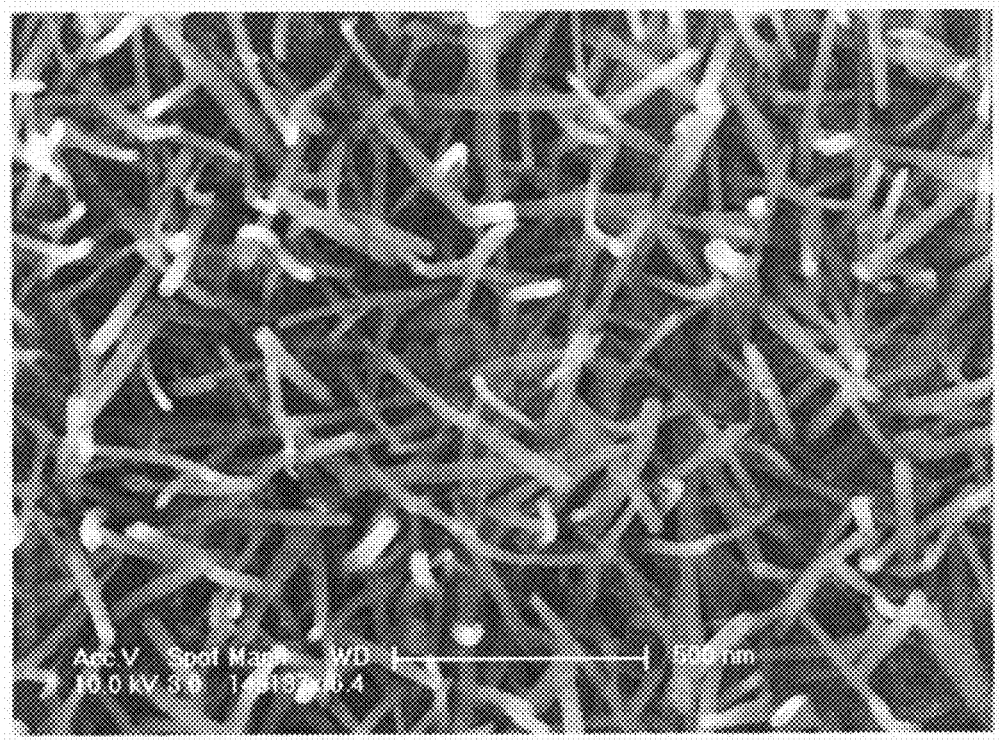
FIG. 3 is a Scanning Electron Microscope (SEM) image of the zinc aluminate nano-material formed by the method of FIG. 1.

Referring to FIG. 3, the zinc aluminate nano-material in the present embodiment is in the form of nanowires. The zinc aluminate nanowires are disorderly distributed on the growing substrate 316. Diameters of the zinc aluminate nanowires range approximately from 10 nanometers to 1 micrometer. Lengths of the zinc oxide nanotubes range approximately from 100 nanometers to 100 micrometers. The zinc aluminate nanowires uniformly distributes without aggregation and have large specific surface area. The zinc aluminate nanowires have excellent catalyzing properties.

The present method for making the zinc aluminate nano-material has many advantages including the following. Firstly, the zinc, aluminate, and oxygen-containing gas used as source materials are environmental friendly. Secondly, the method for making the zinc aluminate nano-material is a simple fabrication procedure and can be achieved at low temperatures in a short time. Thirdly, the zinc aluminate nano-material fabricated by the above-described method has large specific surface area and excellent catalyzing property.

Finally, it is to be understood that the above-described embodiments are intended to illustrate, rather than limit, the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making zinc aluminate nano-material, the method comprising the following steps of:
   (a) providing a growing substrate and a growing device, and the growing device comprising a heating apparatus and a reacting room;
   (b) placing the growing substrate and a quantity of reacting materials into the reaction room, and the reacting materials consisting of substantially pure zinc and substantially pure aluminum;
   (c) introducing an oxygen-containing gas into the reaction room; and
   (d) heating the reaction room to a temperature in the range of about 660° C. to about 1100° C., the pure zinc and pure aluminum begin to vaporize to form gaseous zinc and gaseous aluminum, the gaseous zinc and gaseous aluminum react with the oxygen-containing gas to form zinc aluminate nano-material on the substrate.

2. The method as claimed in claim 1, wherein the growing substrate comprises a material selected from the group consisting of silicon, silicon dioxide, quartz, glass and sapphire.

3. The method as claimed in claim 1, further comprising (e) forming a catalyst layer on the growing substrate before step (b).

4. The method as claimed in claim 3, wherein forming the catalyst layer is performed by the method selected from the group consisting of chemical vapor deposition, sputtering, and plasma-assisted chemical vapor deposition.

5. The method as claimed in claim 3, wherein the material of the catalyst layer is selected from the group consisting of gold, iron, copper, cobalt and nickel.

6. The method as claimed in claim 3, wherein thickness of the catalyst layer ranges from approximately 1 to 500 nanometers.

7. The method as claimed in claim 1, wherein the reacting materials are in form of blocks or powder.

8. The method as claimed in claim 1, wherein the mass ratio of the zinc and aluminum ranges from about 2:1 to about 1:2.

9. The method as claimed in claim 1, wherein both the zinc and aluminum are treated by a diluted acid solution before being placed into the reaction room.

10. The method as claimed in claim 1, wherein the growing substrate is placed above the reacting materials.

11. The method as claimed in claim 1, further comprising (f) supplying a protective gas into the reaction room before step (c).

12. The method as claimed in claim 11, wherein there is a flow rate of the protective gas, the flow rate of the protective gas ranges from about 100 milliliter per minute to about 2000 milliliter per minute.

13. The method as claimed in claim 1, wherein in step (c) the air pressure in the reacting room ranges from about 1 torr to about 50 torrs.

14. The method as claimed in claim 1, wherein the oxygen-containing gas is oxygen gas.

15. The method as claimed in claim 14, wherein there is a flow rate of the oxygen gas, the flow rate the oxygen gas ranges from about 10 milliliter per minute to 1000 milliliters per minute.

16. The method as claimed in claim 1, wherein the oxygen-containing gas is introduced in a manner that oxygen-containing gas flows in a direction such that the reacting materials are exposed before the growing substrate.

17. The method as claimed in claim 1, wherein a period of time for growing the zinc aluminate nano-material ranges from about 10 minutes to about 120 minutes.

18. The method as claimed in claim 1, wherein in step (d), the gaseous zinc reacts with the oxygen gas to fabricate zinc oxide, the gaseous aluminum reacts with the oxygen gas to fabricate alumina, zinc oxide and alumina are deposited on the growing substrate and diffused into each other to form the zinc aluminate nano-material.

19. A method for making zinc aluminate material, the method comprising the following steps of:
  (a) providing a growing substrate and a growing device, and the growing device comprising a heating apparatus and a reacting room;
  (b) placing the growing substrate and a quantity of reacting materials into the reaction room, the reacting materials consisting of substantially pure zinc and substantially pure aluminum and the mass ratio of the zinc and aluminum being in a range from about 2:1 to about 1:2;
  (c) introducing an oxygen-containing gas into the reaction room; and
  (d) heating the reaction room to a temperature in the range of about 660° C. to about 1100° C., the pure zinc and pure aluminum begin to vaporize to form gaseous zinc and gaseous aluminum, the gaseous zinc and gaseous aluminum react with the oxygen-containing gas to form zinc aluminate nano-material on the substrate.

20. A method for making zinc aluminate material, the method comprising the following steps of:
  (a) providing a growing substrate and a growing device, and the growing device comprising a heating apparatus and a reacting room;
  (b) forming a catalyst layer on the growing substrate;
  (c) placing the growing substrate and a quantity of reacting materials into the reaction room, the reacting materials consisting of substantially pure zinc and substantially pure aluminum, and the mass ratio of the zinc and aluminum being in a range from about 2:1 to about 1:2;
  (d) introducing an oxygen-containing gas into the reaction room; and
  (e) heating the reaction room to a temperature in the range of about 660° C. to about 1100° C., the pure zinc and pure aluminum begin to vaporize to form gaseous zinc and gaseous aluminum, the gaseous zinc and gaseous aluminum react with the oxygen-containing gas to form zinc aluminate nano-material on the substrate.

* * * * *